(12) United States Patent
Park

(10) Patent No.: US 11,801,885 B2
(45) Date of Patent: Oct. 31, 2023

(54) SENSOR DEVICE FOR STEERING ACTUATOR

(71) Applicant: HYUNDAI MOBIS CO., LTD., Gangnam-gu (KR)

(72) Inventor: Su Ju Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/651,782

(22) Filed: Feb. 18, 2022

(65) Prior Publication Data

US 2022/0266891 A1    Aug. 25, 2022

(30) Foreign Application Priority Data

Feb. 24, 2021  (KR) .................. 10-2021-0025156

(51) Int. Cl.
  *B62D 3/12* (2006.01)
  *B62D 5/04* (2006.01)
  *F16H 55/06* (2006.01)

(52) U.S. Cl.
  CPC ............ *B62D 3/12* (2013.01); *B62D 5/0481* (2013.01); *F16H 55/06* (2013.01); *F16H 2055/065* (2013.01)

(58) Field of Classification Search
  CPC ............... B62D 3/12; B62D 5/0481; F16H 2055/065; F16H 55/06
  See application file for complete search history.

(56) References Cited

U.S. PATENT DOCUMENTS

| 6,289,586 | B1 * | 9/2001 | Casella | B29D 15/00 74/462 |
| 2008/0016974 | A1 * | 1/2008 | Watanabe | F16H 55/17 74/438 |
| 2016/0091052 | A1 * | 3/2016 | Park | F16H 55/06 74/425 |
| 2018/0347666 | A1 * | 12/2018 | Masuzawa | F16H 55/06 |
| 2020/0240502 | A1 * | 7/2020 | Watzek | F16H 55/17 |
| 2021/0095751 | A1 * | 4/2021 | Stoppel | B29D 15/00 |
| 2022/0185362 | A1 * | 6/2022 | Kinne | B62D 3/12 |

FOREIGN PATENT DOCUMENTS

| FR | 2698945 A1 * | 6/1994 | ......... B22D 19/0036 |
| KR | 10-2207483 | 1/2021 | |

OTHER PUBLICATIONS

Translation of FR2698945A1 (Year: 2023).*

* cited by examiner

*Primary Examiner* — Terence Boes

(74) *Attorney, Agent, or Firm* — DLA PIPER LLP (US)

(57) ABSTRACT

A sensor device for a steering actuator, the sensor device may include: a pinion shaft mounted on a housing part; a first pinion gear integrated with the pinion shaft by injection molding; and a sensor unit coupled to the first pinion gear.

9 Claims, 10 Drawing Sheets

SENSOR DEVICE FOR STEERING ACTUATOR

CROSS-REFERENCE TO RELATED APPLICATION

This application claims priority from and the benefit of Korean Patent Application No. 10-2021-0025156, filed on Feb. 24, 2021, which is hereby incorporated by reference for all purposes as if set forth herein.

BACKGROUND

Field

Exemplary embodiments of the present disclosure relate to a sensor device for a steering actuator, and more particularly, to a sensor device for a steering actuator which may have a simplified assembly process to reduce an assembly time and component costs.

Discussion of the Background

In general, in a vehicle steering device, power steering has been developed and used to augment driver's steering effort to turn the steering wheel in order to facilitate the driving. For such power steering, a hydraulic power steering system using hydraulic pressure, an electric hydraulic power steering system using hydraulic pressure and the electric power of a motor, an electric power steering system simultaneously using only the electric power of a motor, and the like have been developed and used.

Recently, a steer-by-wire (SBW) steering device has been developed and used. The SBW steering device is configured to steer a vehicle using an electric motor, and a mechanical linkage, such as a steering column, a universal joint, or a pinion shaft, between the steering wheel and a wheel is removed from the SBW steering device.

However, in the case of a rack driving SBW steering device of the SBW steering device, gears provided as separate pieces should be fitted to each other in order to mount a sensor for detecting the position of a rack bar on a pinion. Thus, an assembly process is complicated, which may disadvantageously increase an assembly time and an assembly cost. Therefore, there is a need to solve these problems.

The background art of the present disclosure is disclosed in Korean Patent No. 10-2207483 (titled: "ELECTRIC POWER STEERING", registered on Jan. 20, 2021).

SUMMARY

Various embodiments are directed to a sensor device for a steering actuator, which may simplify an assembly process, thereby reducing an assembly time and component costs.

In an embodiment, a sensor device may include: a pinion shaft mounted on a housing part; a first pinion gear integrated with the pinion shaft by injection molding; and a sensor unit coupled to the first pinion gear In addition, the pinion shaft may include a metallic material, and the first pinion gear may include a plastic material.

In addition, the pinion shaft may include a first pinion shaft coupled to the sensor unit. The first pinion shaft may include a first coupling recess on an outer circumferential portion thereof to increase coupling force to the first pinion gear during the injection molding of the first pinion gear.

In addition, the first pinion gear may include: a first pinion gear protrusion fitted into and integrally coupled to the first coupling recess; and a first pinion gear body extending outward from the first pinion gear protrusion, and being in contact with an outer portion of the first pinion shaft.

In addition, a width of the first pinion gear body may be greater than a width of the first pinion gear protrusion.

In addition, the sensor device may further include a second pinion gear integrated with the pinion shaft by injection molding, and engaged with a rack bar.

In addition, the second pinion gear may include a plastic material.

In addition, the pinion shaft may further include a second pinion shaft connected to the first pinion shaft. The second pinion shaft may include a second coupling recess on an outer circumferential portion thereof to increase coupling force to the first pinion gear during the injection molding of the first pinion gear.

In addition, the second pinion gear may include: a second pinion gear protrusion fitted into and integrally coupled to the second coupling recess; and a second pinion gear body extending outward from the second pinion gear protrusion, and integrally coupled to an outer portion of the second pinion shaft.

In addition, a width of the second pinion gear body may be greater than a width of the second pinion gear protrusion.

In the sensor device for a steering actuator according to the present disclosure, the first pinion gear and the second pinion gear can be insert injection molded on the pinion shaft to simplify an assembly process, thereby reducing an assembly time.

In addition, according to the present disclosure, since the pinion shaft includes a metallic material and each of the first pinion gear and the second pinion gear includes a plastic material, component costs can be reduced.

DETAILED DESCRIPTION OF THE ILLUSTRATED EMBODIMENTS

Figure 1:
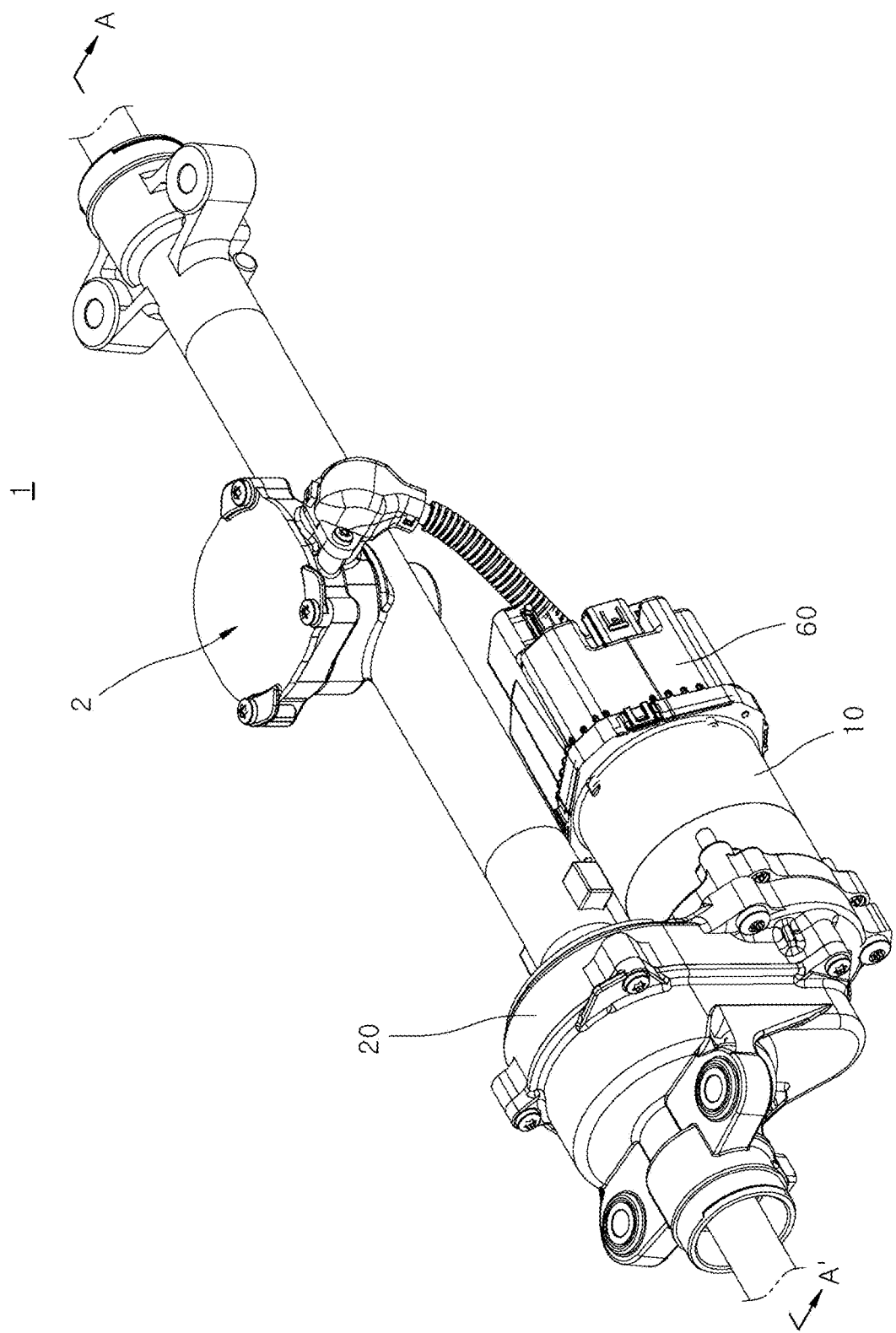
FIG. 1 is a perspective view illustrating a vehicle steering device according to an embodiment of the present disclosure.

Hereinafter, a sensor device for a steering actuator according to the present disclosure will be described with reference to the accompanying drawings through various embodiments.

In the following description, the thicknesses of lines or the sizes of components illustrated in the drawings may be exaggerated for clarity and convenience of explanation. In addition, terms used herein are defined in consideration of functions thereof in the present disclosure, but may vary depending on the intentions of users or operators, or practices. Therefore, the terms shall be defined on the basis of the description throughout the specification.

Figure 2:
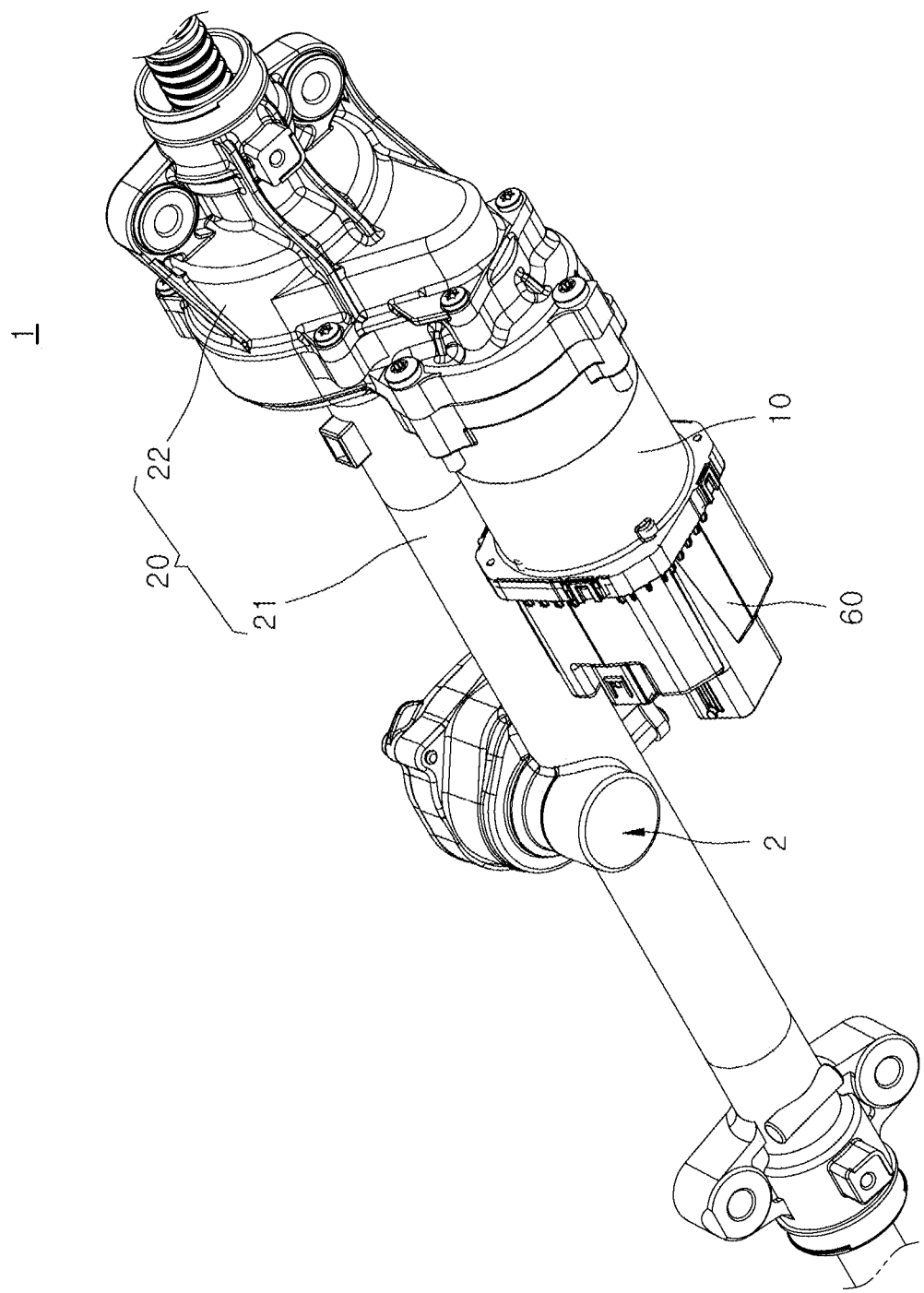
FIG. 2 is a perspective view illustrating the vehicle steering device according to the embodiment of the present disclosure, taken in a different direction.
Figure 3:
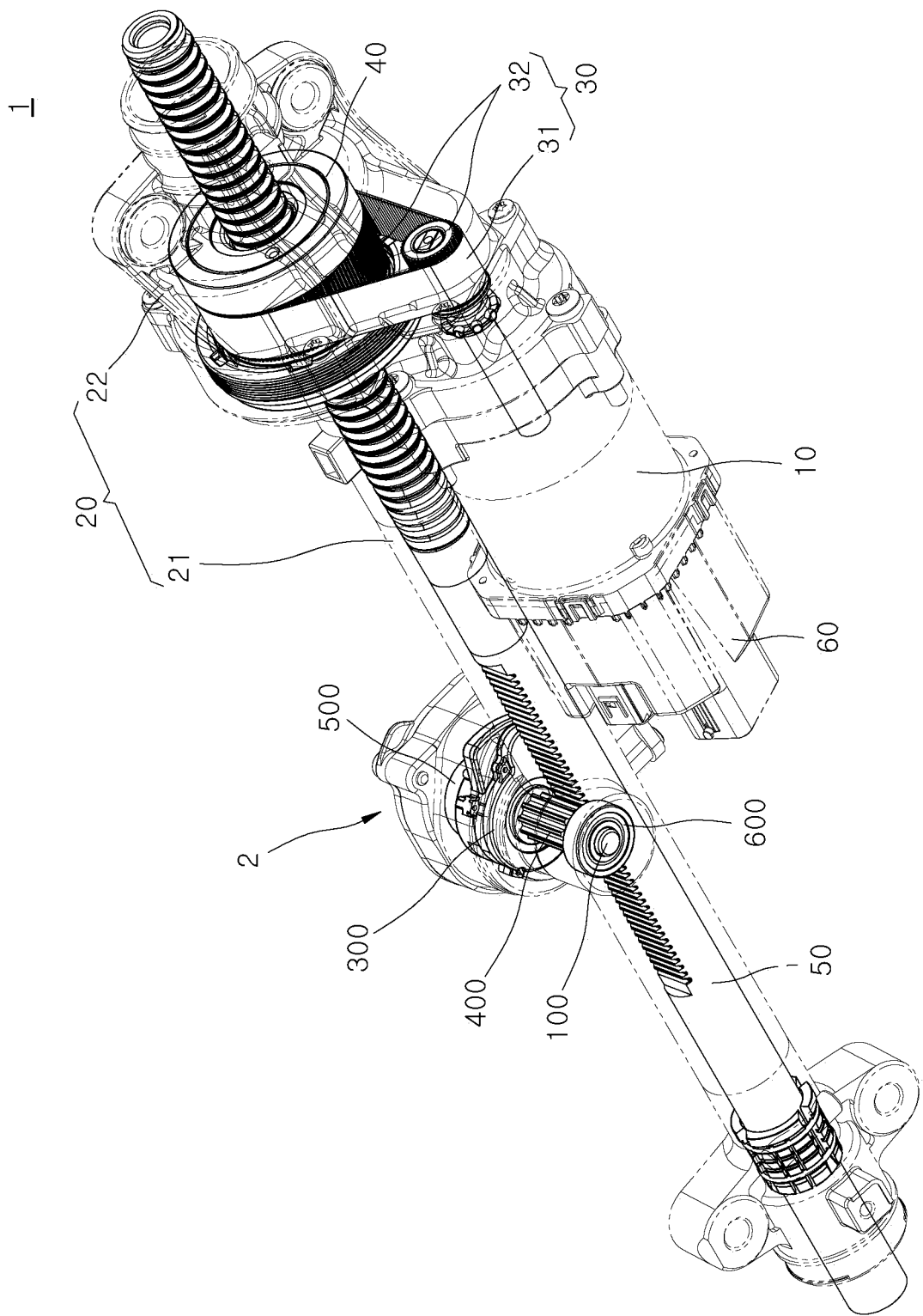
FIG. 3 is a perspective view of the main portions of the vehicle steering device according to the embodiment of the present disclosure.
Figure 4:
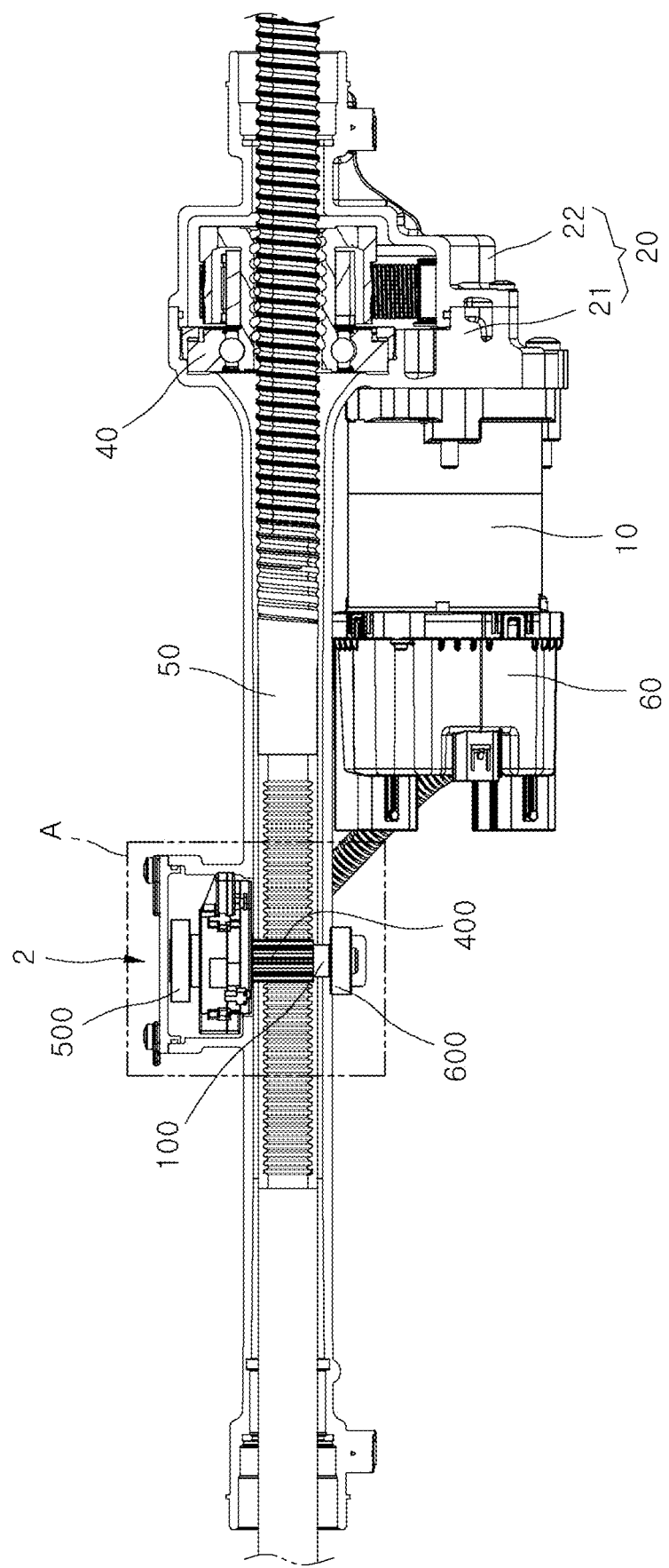
FIG. 4 is a cross-sectional view of the vehicle steering device according to the embodiment of the present disclosure.
Figure 5:
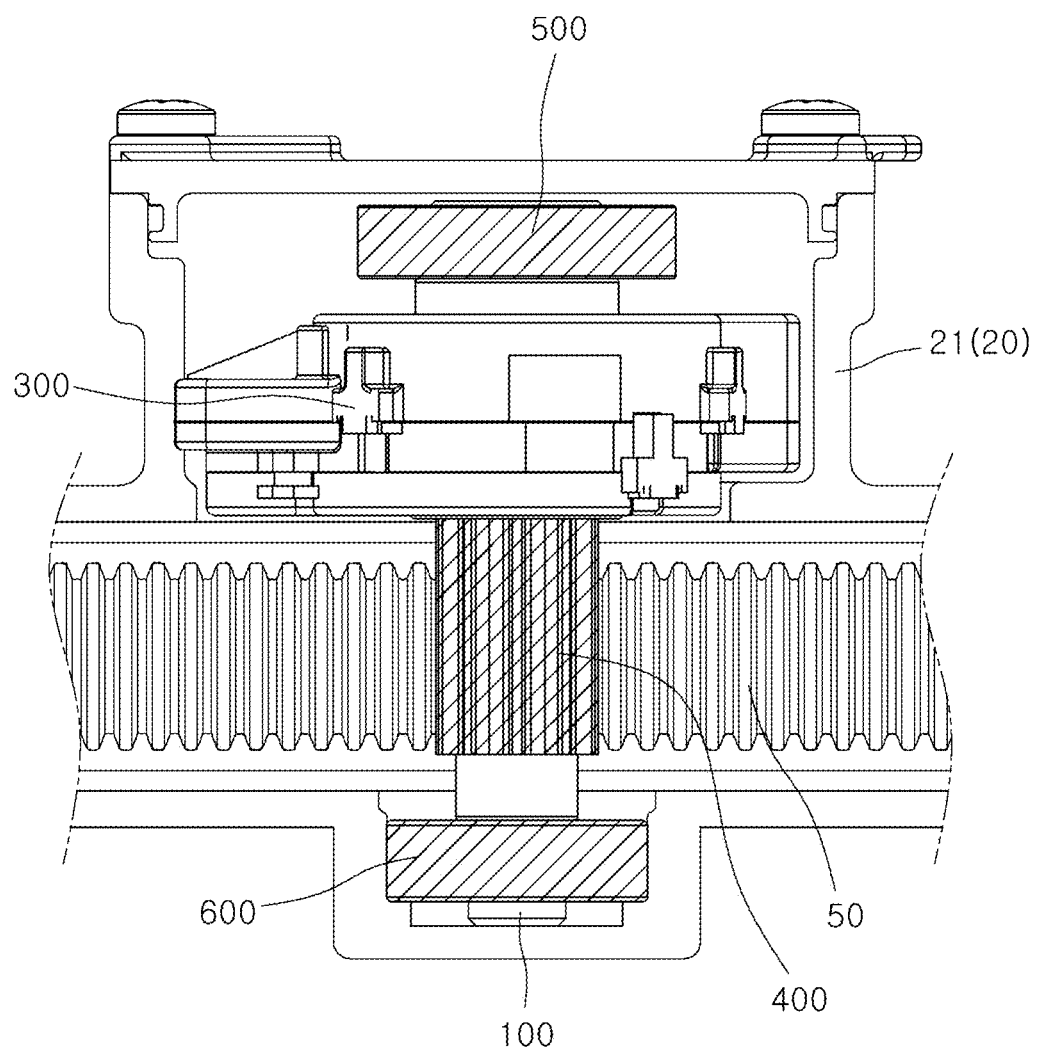
FIG. 5 is an enlarged view of the portion A of FIG. 4.
Figure 6:
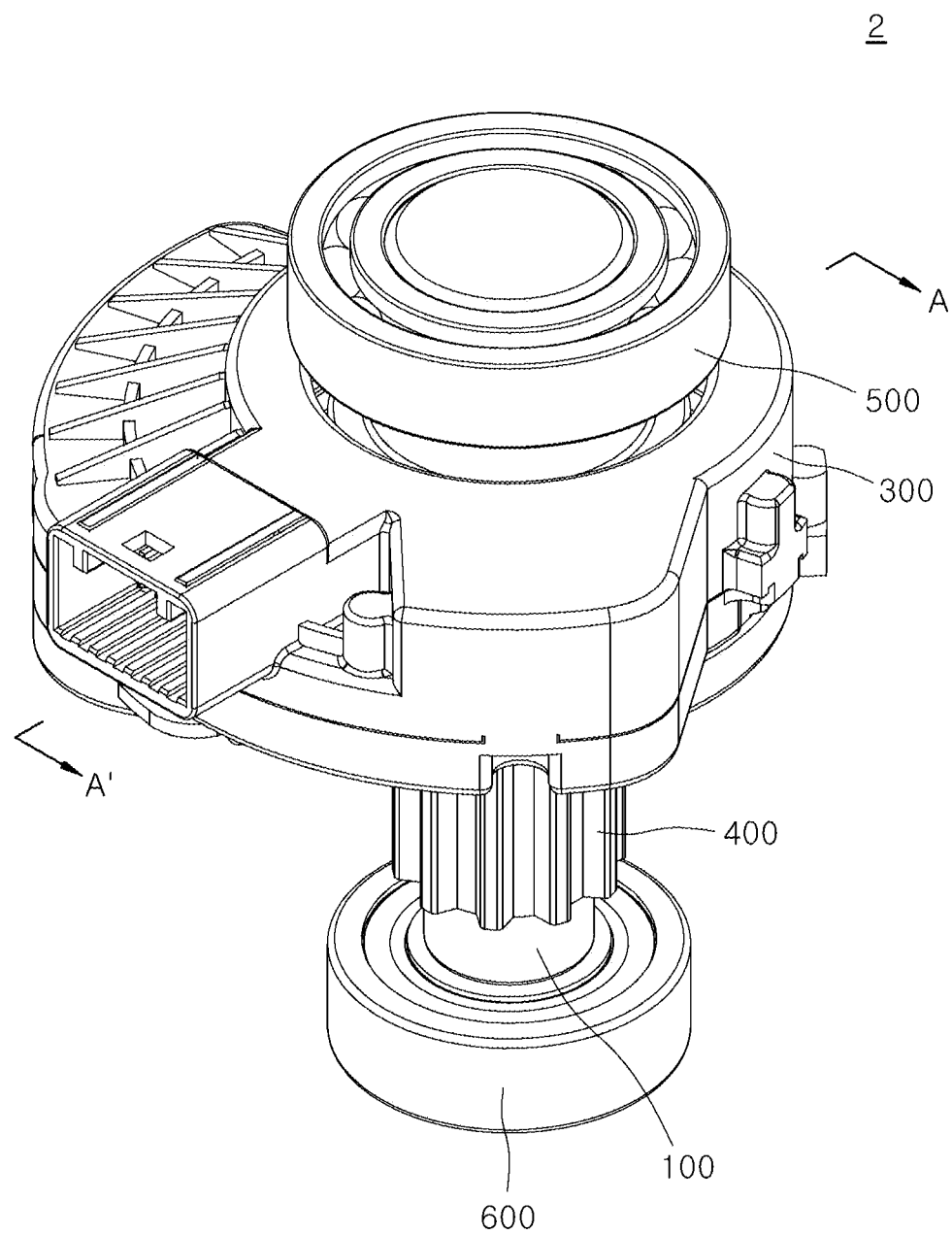
FIG. 6 is a perspective view illustrating a sensor device for a steering actuator according to an embodiment of the present disclosure.
Figure 7:
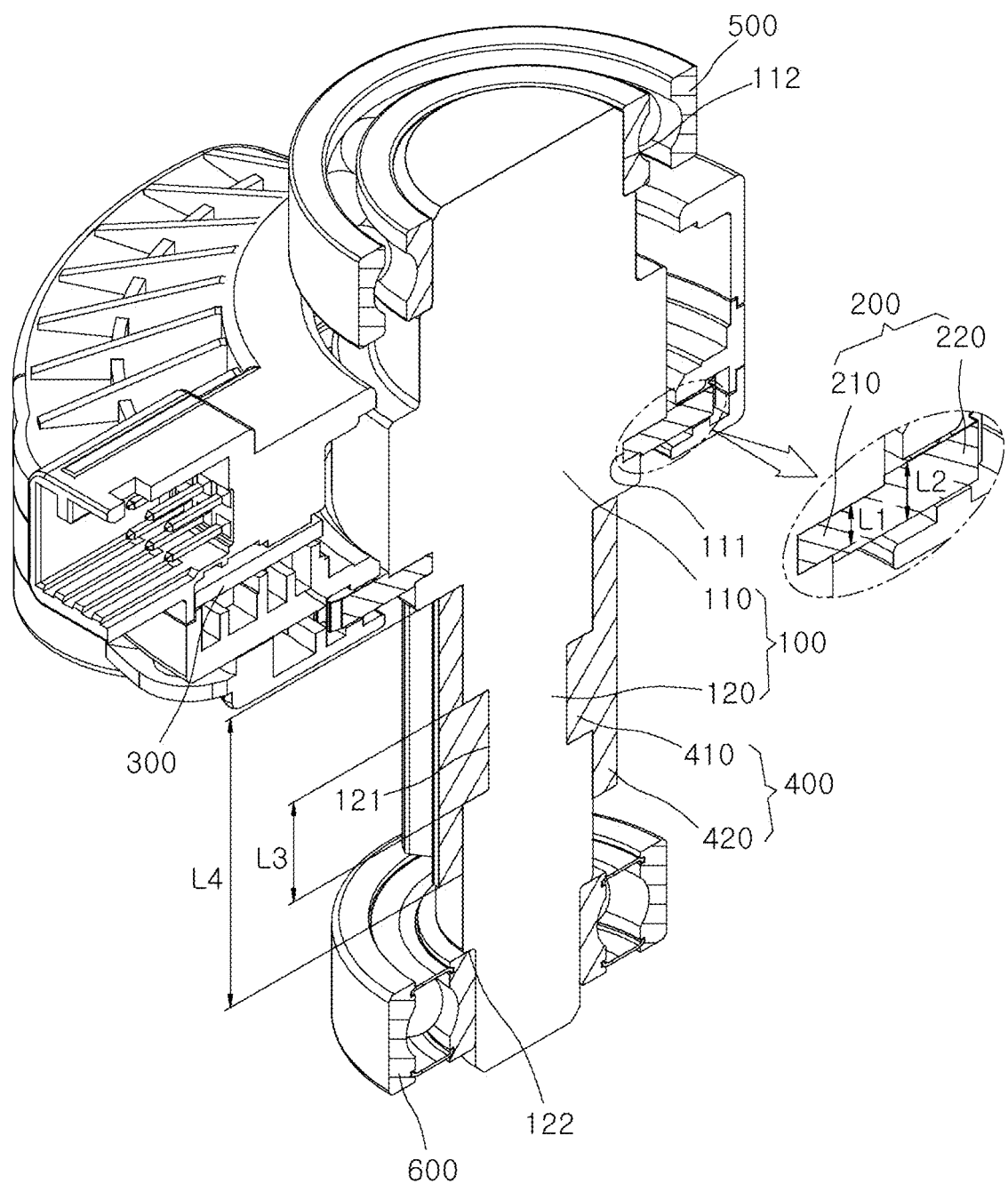
FIG. 7 is a cross-sectional view taken along line A-A' in FIG. 6.
Figure 8:
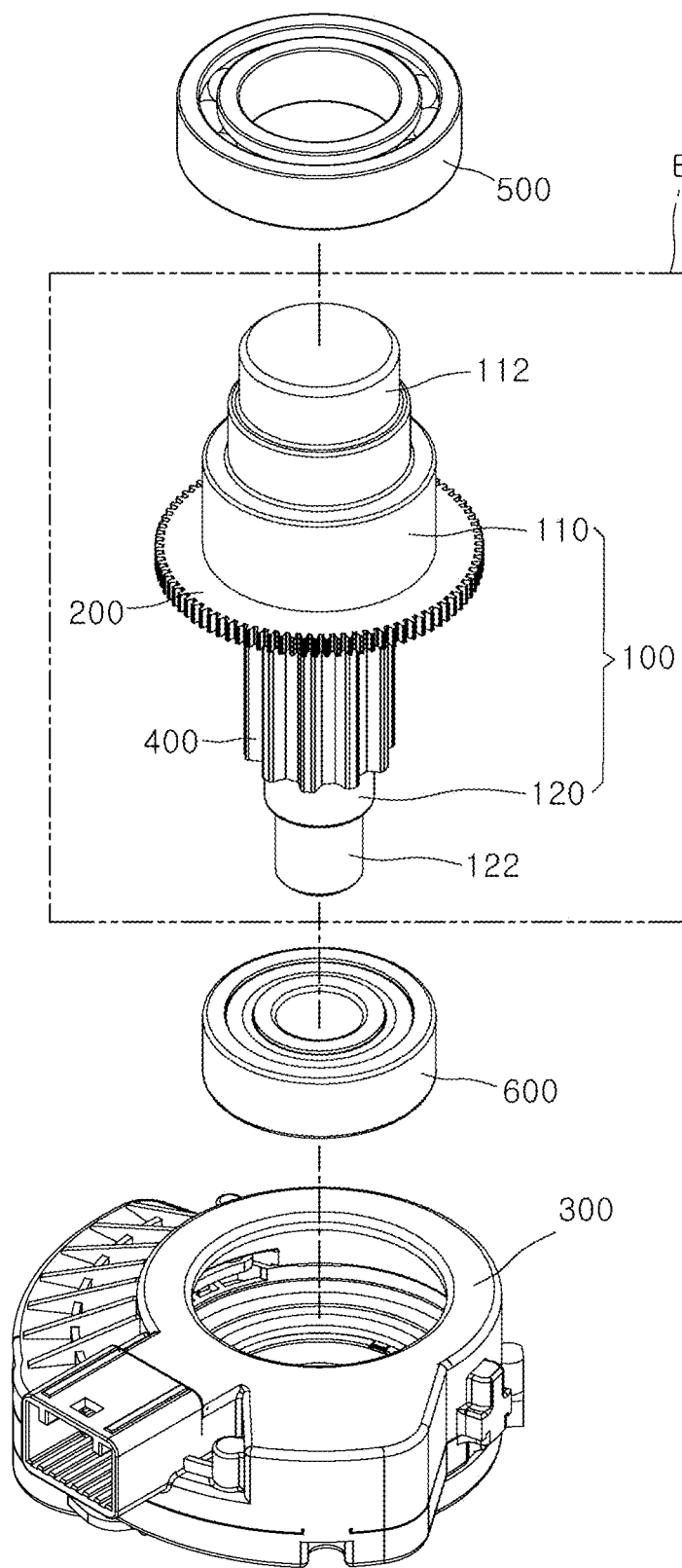
FIG. 8 is an exploded perspective view of the sensor device for a steering actuator according to an embodiment of the present disclosure.
Figure 9:
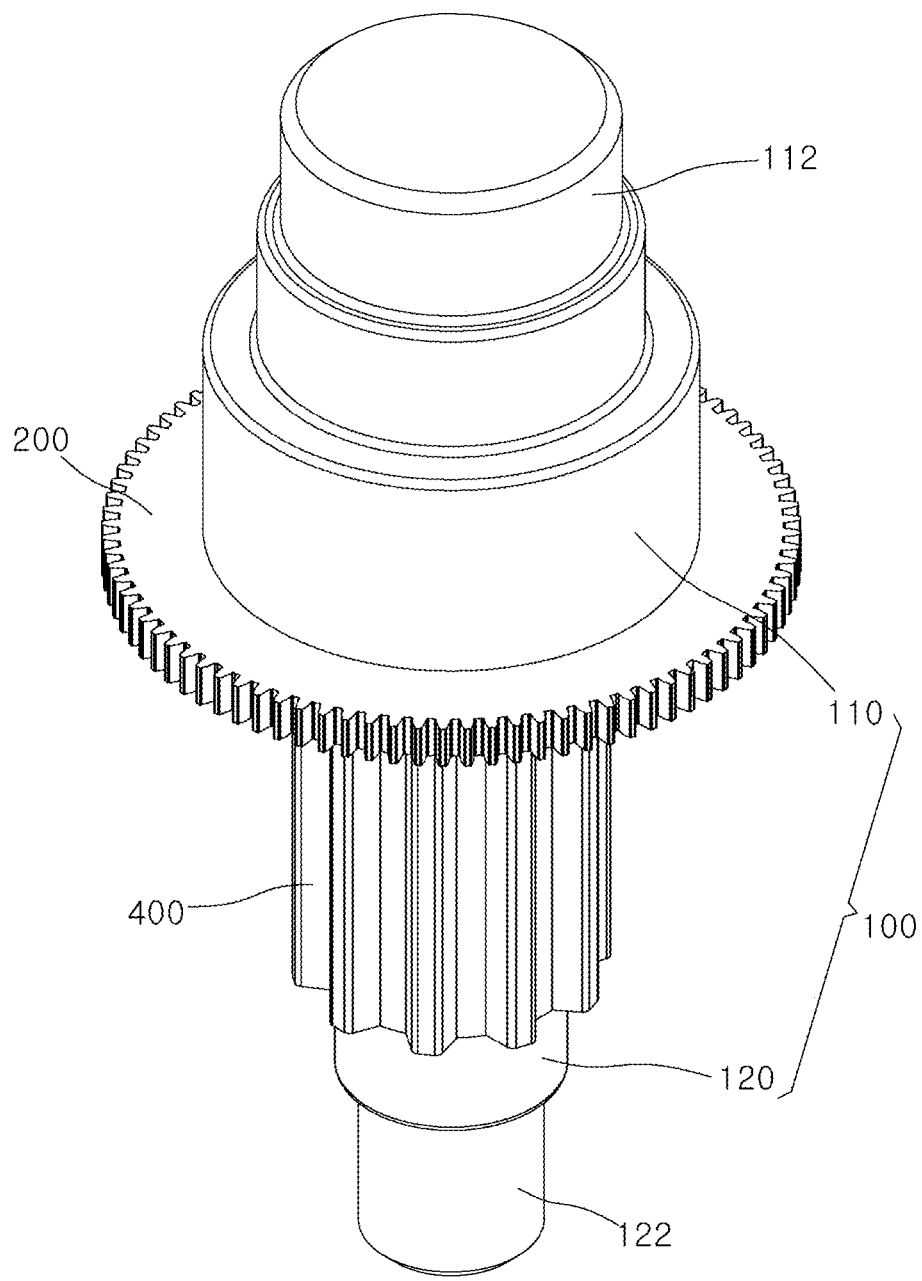
FIG. 9 is an enlarged view of the portion B in FIG. 8.
Figure 10:
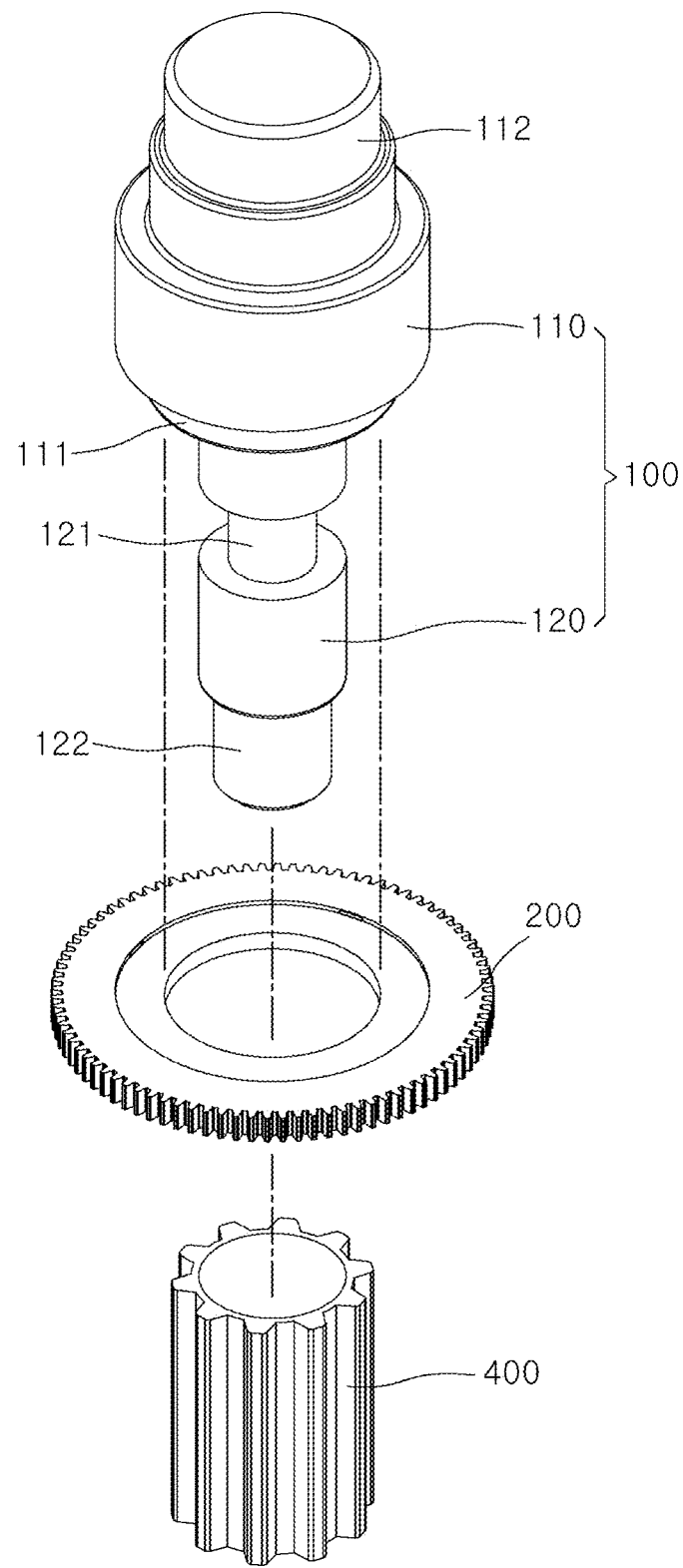
FIG. 10 is an exploded perspective view of FIG. 9.

FIG. 1 is a perspective view illustrating a vehicle steering device according to an embodiment of the present disclosure, FIG. 2 is a perspective view illustrating the vehicle steering device according to the embodiment of the present disclosure, taken in a different direction, FIG. 3 is a perspective view of the main portions of the vehicle steering device according to the embodiment of the present disclosure, FIG. 4 is a cross-sectional view of the vehicle steering device according to the embodiment of the present disclosure, FIG. 5 is an enlarged view of the portion A of FIG. 4, FIG. 6 is a perspective view illustrating a sensor device for a steering actuator according to an embodiment of the present disclosure, FIG. 7 is a cross-sectional view taken along line A-A' in FIG. 6, FIG. 8 is an exploded perspective view of the sensor device for a steering actuator according to an embodiment of the present disclosure, FIG. 9 is an enlarged view of the portion B in FIG. 8, and FIG. 10 is an exploded perspective view of FIG. 9.

Referring to FIGS. 1 to 3, a vehicle steering device 1 according to an embodiment of the present disclosure includes a motor 10, a housing part 20, a decelerator 30, a bolt-nut module 40, a rack bar 50, a control unit 60, and a sensor device 2 for a steering actuator. The motor 10 is driven by an output signal from the control unit 60 to generate a torque, i.e., steering force. Here, the control unit 60 performs, by an electronic control unit (ECU), the operations of receiving steering information regarding the steering wheel (not shown), vehicle driving information, and the like through the sensor device 2 for a steering actuator, calculating a control value for a target steering ratio, and driving the motor 10 using the calculate control value. The housing part 20 is connected to the motor 10, and has the decelerator 30, the bolt-nut module 40, and the sensor device 2 for a steering actuator disposed therein. The housing part 20 includes a first housing 21 and a second housing 22. The first housing 21 has the bolt-nut module 40 and the sensor device 2 for a steering actuator disposed therein. The second housing 22 is coupled to the first housing 21, and has the decelerator 30 disposed therein.

The decelerator 30 includes a belt 31 and a pulley 32, and receives and amplifies the torque generated by the motor 10. The bolt-nut module 40 receives the amplified torque from the decelerator 30 and transfers the received amplified torque to the rack bar 50.

Referring to FIGS. 4 to 10, the sensor device 2 for a steering actuator includes a pinion shaft 100, a first pinion gear 200, and a sensor unit 300. The pinion shaft 100 is disposed inside the housing part 20.

The first pinion gear 200 is integrated with the pinion shaft 100 by injection molding. The sensor unit 300 is coupled to the first pinion gear 200. The sensor unit 300 has a printed circuit board (PCB) disposed therein, and serves to detect the steering angle of the steering wheel.

Specifically, after the pinion shaft 100 is injection molded, the first pinion gear 200 is insert injection molded on the pinion shaft 100. As a result, by insert injection molding the first pinion gear 200 on the pinion shaft 100, the present disclosure can reduce some operations of an assembly process, thereby reducing an assembly time, compared to the related art in which the pinion shaft 100 and the first pinion gear 200 which are separate components should be fitted to each other.

The pinion shaft 100 may include a metallic material. The first pinion gear 200 may include a plastic material. Thus, the present disclosure can reduce component costs, compared to the related art in which each of the pinion shaft 100 and the first pinion gear 200 includes a metal.

The sensor device 2 for a steering actuator further includes a second pinion gear 400. The second pinion gear 400 is integrated with the pinion shaft 100 by injection molding, and is engaged with the rack bar 50. The second pinion gear 400 is injection molded on the pinion shaft 100.

Specifically, after the pinion shaft 100 is injection molded, the first pinion gear 200 and the second pinion gear 400 are insert injection molded on the pinion shaft 100. As a result, by insert injection molding both the first pinion gear 200 and the second pinion gear 400 on the pinion shaft 100, the present disclosure can reduce some operations of an assembly process, thereby reducing an assembly time, compared to the related art in which the pinion shaft 100, the first pinion gear 200, and the second pinion gear 400 which are separate components should be fitted to one another.

The second pinion gear 400 may include a plastic material. Thus, the present disclosure can reduce component costs, compared to the related art in which each of the pinion shaft 100, the first pinion gear 200, and the second pinion gear 400 includes a metal.

The pinion shaft 100 includes a first pinion shaft 110 and a second pinion shaft 120. The first pinion shaft 110 is coupled to the sensor unit 300, and has a first coupling recess 111 on the outer circumferential portion thereof to increase coupling force to the first pinion gear 200 during the injection molding of the first pinion gear 200. The second pinion shaft 120 is connected to the first pinion shaft 110, and has a second coupling recess 121 on the outer circumferential portion thereof to increase coupling force to the second pinion gear 400 during the injection molding of the second pinion gear 400.

The first pinion gear 200 includes a first pinion gear protrusion 210 and a first pinion gear body 220. The first pinion gear protrusion 210 is inserted into and integrally coupled to the first coupling recess 111. The first pinion gear body 220 extends outward from the first pinion gear protrusion 210, and is integrally coupled to an outer portion of the first pinion shaft 110. The width L1 of the first pinion gear body 220 is greater than the width L2 of the first pinion gear protrusion 210. Thus, the contact area of the first pinion gear 200 with the pinion shaft 100 may be increased, thereby increasing coupling force to the pinion shaft 100.

The first pinion shaft 110 has a first bearing coupling portion 112 to which a first bearing portion 500 is coupled, and the second pinion shaft 120 has a second bearing coupling portion 122 to which a second bearing portion 600 is coupled.

The second pinion gear 400 includes a second pinion gear protrusion 410 and a second pinion gear body 420. The second pinion gear protrusion 410 is fitted into and integrally coupled to the second coupling recess 121. The second pinion gear body 420 extends outward from the second pinion gear protrusion 410, and is integrally coupled to an outer portion of the second pinion shaft 120. The width L4 of the second pinion gear body 420 is greater than the width L3 of the second pinion gear protrusion 410. Thus, the contact area of the second pinion gear 400 with the pinion shaft 100 may be increased, thereby increasing coupling force to the pinion shaft 100.

As described above, in the sensor device 2 for a steering actuator according to the present disclosure, the first pinion gear 200 and the second pinion gear 400 can be insert injection molded on the pinion shaft 100 to simplify an assembly process, thereby reducing an assembly time.

In addition, since the pinion shaft 100 includes a metallic material and each of the first pinion gear 200 and the second pinion gear 400 includes a plastic material, component costs can be reduced.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims.

Thus, the true technical scope of the disclosure should be defined by the following claims.

What is claimed is:

1. A sensor device for a steering actuator, the sensor device comprising:
    a pinion shaft mounted on a housing part, the pinion shaft including a first coupling recess extending from an outer circumferential portion of the pinion shaft towards an inner circumferential portion of the pinon shaft, and a second coupling recess extending from the outer circumferential portion of the pinion shaft towards the inner circumferential portion of the pinon shaft;
    a first pinion gear integrated with the pinion shaft by insert injection molding the first pinion gear in the first coupling recess on the pinion shaft;
    a second pinion gear integrated with the pinion shaft by insert injection molding the second pinion gear in the second coupling recess on the pinion shaft; and
    a sensor unit coupled to the first pinion gear,
    wherein the first coupling recess is positioned on the pinion shaft at a first location that aligns the first pinion gear with the sensor unit, and the second coupling recess is positioned on the pinion shaft at a second location that aligns the second pinion gear with a rack bar of the steering actuator.

2. The sensor device of claim 1, wherein the pinion shaft comprises a metallic material and the first pinion gear comprises a plastic material.

3. The sensor device of claim 1, wherein the pinion shaft comprises a first pinion shaft coupled to the sensor unit, the first pinion shaft comprising the first coupling recess.

4. The sensor device of claim 3, wherein the first pinion gear comprises:
    a first pinion gear body extending outwardly from a first pinion gear protrusion of the first pinion gear, and being in contact with an outer portion of the first pinion shaft.

5. The sensor device of claim 4, wherein a width of the first pinion gear body is greater than a width of the first pinion gear protrusion.

6. The sensor device of claim 3, wherein the second pinion gear comprises a plastic material.

7. The sensor device of claim 3, wherein the pinion shaft further comprises a second pinion shaft connected to the first pinion shaft, the second pinion shaft comprising the second coupling recess on an outer circumferential portion thereof.

8. The sensor device of claim 7, wherein the second pinion gear comprises:
    a second pinion gear protrusion fitted into and integrally coupled to the second coupling recess; and
    a second pinion gear body extending outwardly from the second pinion gear protrusion, and integrally coupled to an outer portion of the second pinion shaft.

9. The sensor device of claim 8, wherein a width of the second pinion gear body is greater than a width of the second pinion gear protrusion.

* * * * *